United States Patent [19]
Barnes

[11] 3,712,787
[45] Jan. 23, 1973

[54] APPARATUS FOR MOULDING HELMET SHELLS AND THE LIKE

[76] Inventor: Ralph Barnes, 18909 Anelo Avenue, Gardena, Calif. 90247

[22] Filed: Nov. 15, 1971

[21] Appl. No.: 199,057

Related U.S. Application Data

[62] Division of Ser. No. 97,619, Dec. 14, 1969.

[52] U.S. Cl. ...................425/438, 425/444, 249/67
[51] Int. Cl. ...........................B29c 7/00, B29f 1/14
[58] Field of Search ...249/67, 68; 425/436, 438, 444

[56] References Cited

UNITED STATES PATENTS

| | | | |
|---|---|---|---|
| 2,718,032 | 9/1955 | Harvey | 249/67 X |
| 2,965,932 | 12/1960 | Knowles | 264/251 |
| 3,278,136 | 10/1966 | Rosen | 242/138 |
| 3,290,724 | 12/1966 | Rondum | 425/444 |
| 3,357,043 | 12/1967 | Doucet | 425/444 |

*Primary Examiner*—J. Howard Flint, Jr.
*Attorney*—Theodore H. Lassagne

[57] ABSTRACT

Injection moulding apparatus for moulding helmet shells forms the shells upon a rigid core from which they are removed by a reciprocable ejector slide provided with a pivotally mounted head for engaging an edge of the shell and fulcruming it upon the opposite edge.

1 Claim, 10 Drawing Figures

PATENTED JAN 23 1973

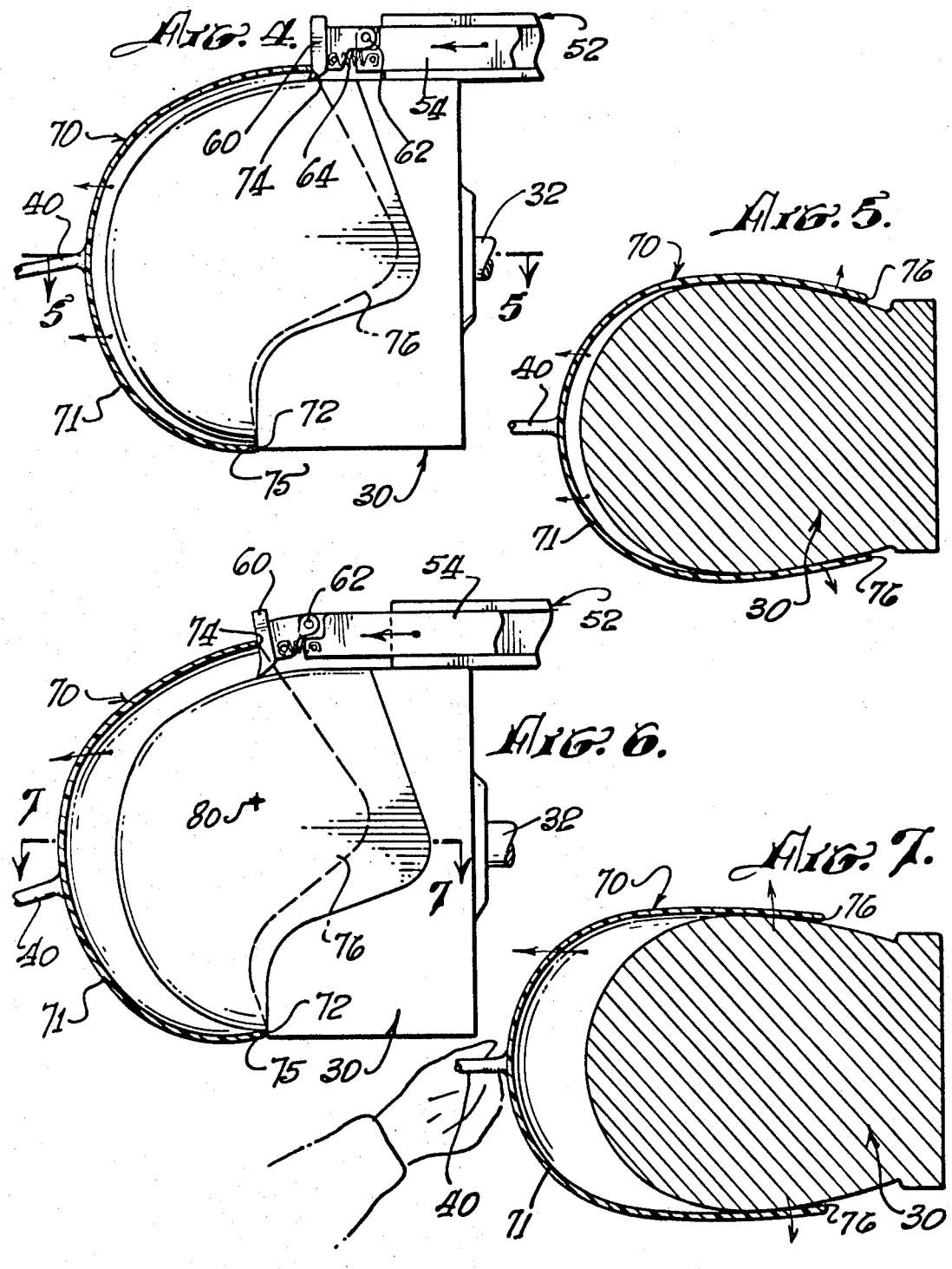

APPARATUS FOR MOULDING HELMET SHELLS AND THE LIKE

CROSS REFERENCE TO RELATED APPLICATION

This is a division of application Ser. No. 97,619 filed Dec. 14, 1969.

BACKGROUND OF THE INVENTION

1. Field of the Invention

In the injection moulding of plastic articles, thermoplastic resins are injected into a cooled sectional mould under pressure. After solidification, the mould is opened and the moulded article is removed. When articles having a hollow interior are to be moulded by such a process, the mould employed comprises a cavity and a core adapted to be enclosed within the cavity to define the wall thickness of the article to be moulded. When hollow articles having an opening defined by an edge, opposite portions of which are spaced from each other a distance less than the smallest internal dimension of the article, are to be moulded, removal of the moulded article from the core following opening of the mould has required the provision of some means for effectively reducing the size of the core sufficiently to permit removal from it of the moulded article.

2. Description of the Prior Art

According to the prior practice, the cores provided for use in injection moulding operations of the character described have usually been made in a plurality of sections; means being provided for expanding the parts of the sectional core for moulding and contracting them to permit removal of the moulded article from the core when the mould is opened. Since, however, both the mould and the core must be cooled, the necessity for piping cooling fluid into a plurality of core sections introduces undesirable complications into the structure, and this consideration together with the requirement for the provision of mechanical or hydraulic means for expanding and contracting the parts of such sectional cores has made the production of moulded articles requiring such cores relatively expensive as compared with the production of articles capable of being moulded on rigid cores.

SUMMARY OF THE INVENTION

The present invention provides apparatus whereby hollow plastic shells having an opening defined by an edge, opposite portions of which are spaced from each other a distance less than the smallest internal dimension of the shell, may be injection moulded upon a rigid core and removed therefrom by employing the moulded shell as a lever to temporarily flex the closely spaced edge portions over the larger portions of the core.

In its application to articles such as helmet shells comprising a portion of generally hemiellipsoidal shape provided with integral, opposite and converging marginal lobes; the ends of the lobes being spaced from each other a distance less than the length of the minor axis of the hemiellipsoidal portion, the helmet shell is cast of a material, such as an acrylic plastic, between separable dies defining the mould cavity, upon a rigid core configured to the interior of the helmet shell. The wall thickness of such a shell having a major axis of about 9 inches and a minor axis of about 8 inches is of the order of 0.10 inch and, in such a configuration, the material employed is susceptible of limited flexure in response to bending forces, but essentially unyielding to compressive forces.

After the helmet shell material, therefore, has cooled to the point of solidification, the die is separated and the core and helmet shell, which remains on the core, is separated from the die. The helmet shell's edge between the lobes is then engaged by stripping means which engage one edge of the moulded helmet shell to rock it about an opposite edge fulcrumming on a shoulder on the core, thus exerting sufficient force to temporarily flex the lobes outwardly to the maximum dimension of the helmet's interior. This flexing is accomplished by a wedging, or camming, action of the core surface upon the interior surfaces of the lobes as the helmet is rocked in relation to the core and is accompanied by a temporary distortion of the hemiellipsoidal portion toward a more nearly spherical configuration.

DESCRIPTION OF THE DRAWING

FIG. 4 is a detail view in side elevation of the core, stripping device, and helmet shell as positioned near the beginning of the removal of the helmet shell from the core;

FIG. 5 is a detail plan view in section taken on the line 5—5 of FIG. 4;

FIG. 6 is a detail view in side elevation of the core, stripping device, and helmet shell as positioned near the conclusion of the removal of the helmet shell from the core;

FIG. 7 is a detail plan view in section taken on the line 7—7 of FIG. 6;

DESCRIPTION OF THE PREFERRED EMBODIMENT

Figure 1:
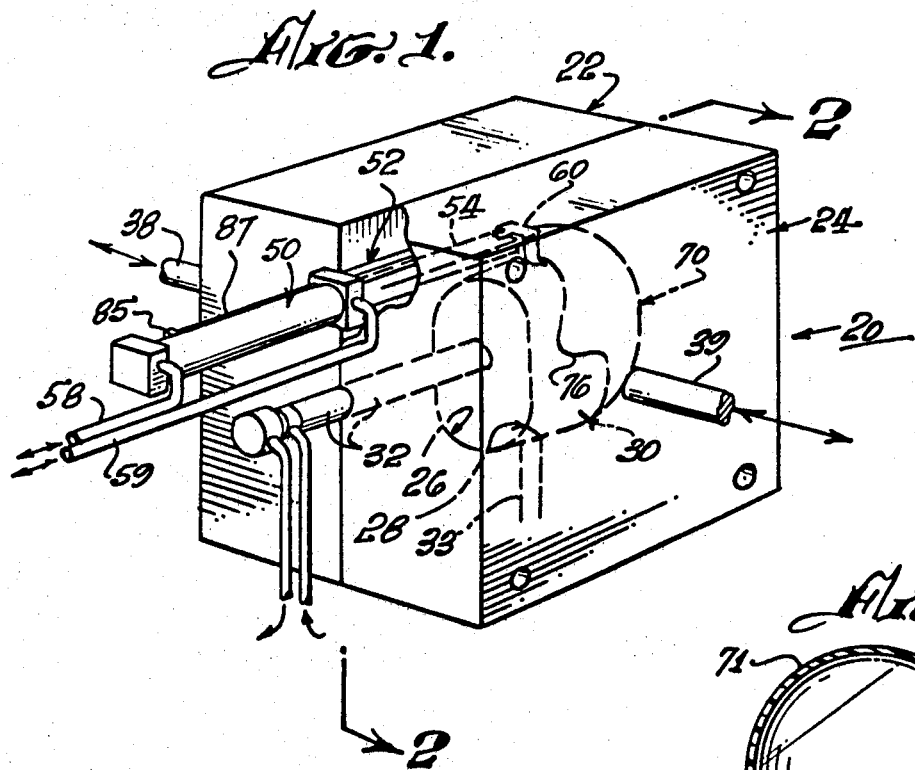
FIG. 1 is a schematic view, in perspective, of apparatus embodying the present invention.
Figure 9:
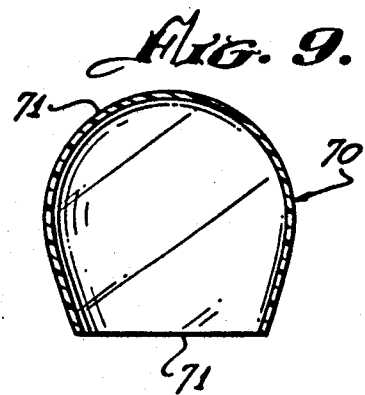
FIG. 9 is a front elevational view in section taken on the line 9—9 of FIG. 8.
Figure 2:
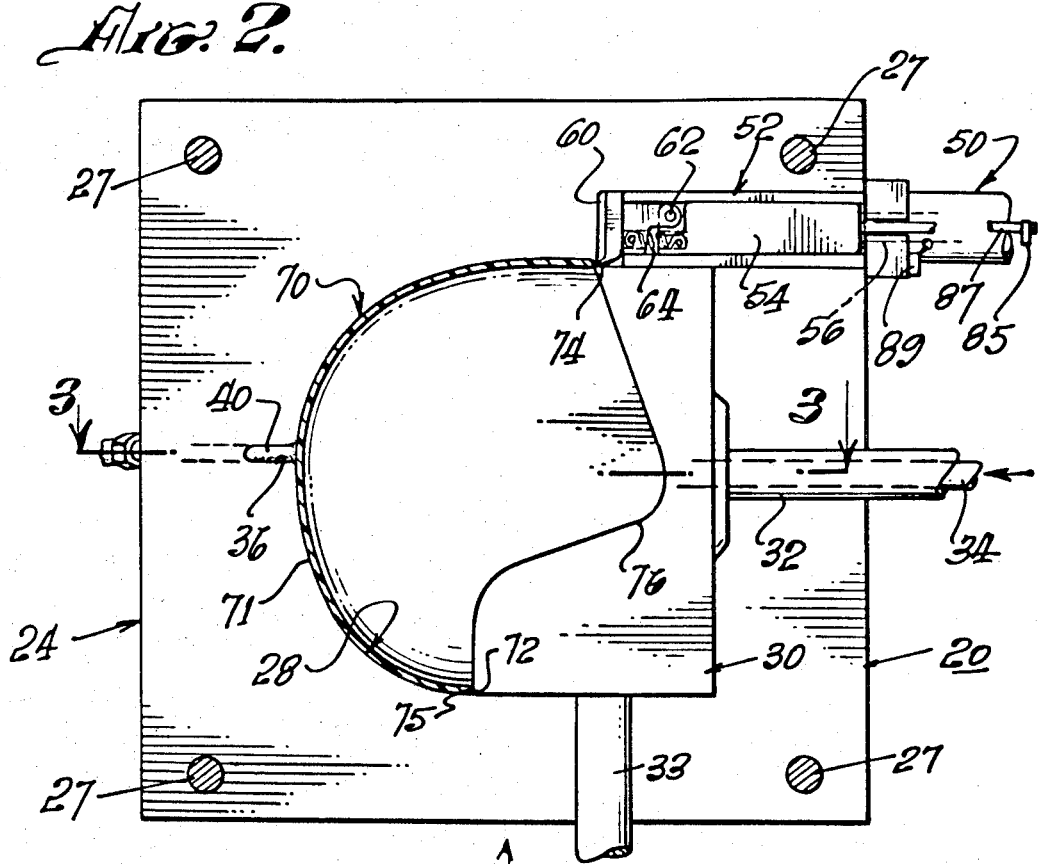
FIG. 2 is a view in side elevation and partly in section taken along the line 2—2 of FIG. 1.
Figure 3:
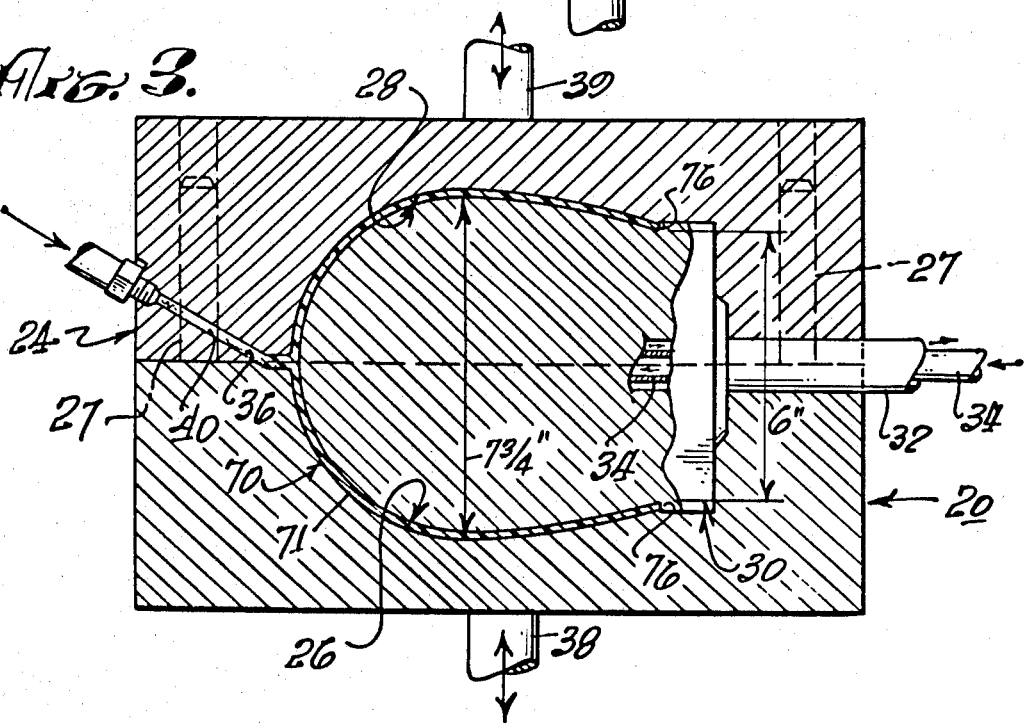
FIG. 3 is a plan view in section taken on the line 3—3 of FIG. 2.

As shown in FIGS. 1, 2 and 3, there is provided a die 20 comprising separable metal halves 22 and 24. A cavity 26 formed in the die half 22 and a cavity 28 formed in the die half 24 are aligned with each other by dowels 27 carried by die half 22 and mating with holes in the die half 24 when the die halves are in the closed position in which they are shown in FIGS. 1 and 3; thus defining a single mould cavity.

Within the mould cavity 26–28 thus defined there is disposed a rigid metal core 30 secured to a support tube 32 and post 33 fixed to the apparatus frame (not shown). The core 30 is cooled by fluid introduced into the interior thereof through a tube 34 within the support tube 32 and exhausting through the space between tubes 32 and 34.

Means are provided for introducing into the space between the walls of the mould cavity 26–28 and the core 30 a thermoplastic synthetic resin heated to fluidity. As shown in FIGS. 2 and 3 this comprises a sprue 36 through which the hot fluid material is introduced under pressure, as is well known in the art.

The synthetic resin employed for this purpose may be of any of various known substantially inelastic materials of this class possessing sufficient flexibility and resilience to yield to the extent required to enable removal of the particular moulded article from the core, as hereinafter described, and to resume its original moulded shape following such removal, but possessing sufficient rigidity when set to sustain the compressive forces incident to removal from the core as hereinafter described. In the case of the moulded helmet shell shaped and proportioned as shown and described herein, well known types of thermoplastic acrylic resins, such as "Lexan," have been found satisfactory.

Following setting of the plastic material in the mould cavity, the die halves 26 and 28 are separated from each other and from the core 30 carrying the moulded piece, by hydraulic actuators (not shown) acting through rods 38 and 39. In the course of this separation, the set plastic material within the sprue 36 is left attached, as a pigtail 40 (FIGS. 4–7) to the moulded piece.

Means are provided which are adapted to be actuated following this die separation for separating the moulded piece from the core. As shown in FIGS. 1 and 2, there is supported in the main frame of the apparatus, in fixed relation to the core 30 and its supports, a hydraulic cylinder 50 carrying a guide frame 52 within which there is slidably mounted on ejector slide 54 movable by a piston rod 56 connected to a piston within the cylinder 50. By means of hoses 58 and 59 (FIG. 1), hydraulic fluid under pressure may be admitted selectively to either end of the cylinder 50 and discharged from the opposite end thereof, a conventional magnetic valve (not shown) being provided for this purpose.

An ejector head 60 (FIGS. 2, 4 and 6) is pivotally mounted at 62 adjacent the opposite end of the ejector slide 54 and a spring 64 tensioned between the head 60 and slide 54 urges the head 60 counterclockwise around its pivot 62.

Figure 8:
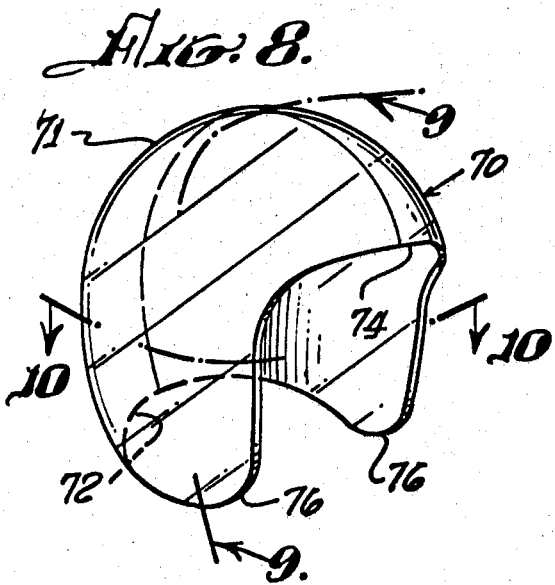
FIG. 8 is a view in perspective of the moulded helmet shell.
Figure 10:
FIG. 10 is a plan view in section taken on the line 10—10 of FIG. 8.

The moulded piece 70 is a helmet shell, as shown in FIG. 8, constituted by a generally hemiellipsoidal portion 71, the major axis of which extends as shown in FIGS. 2, 4 and 6 from an edge 72 to an opposite edge 74. As best shown in FIGS. 3, 5, 7, 9 and 10, integral lobes or projections 76 disposed at the ends of the minor axis of the hemiellipsoidal portion converge toward each other to such an extent that at their ends they are spaced a distance less than the length of the minor axis of the hemiellipsoidal portion 71; the ratio of the minimum distance between edges of the projections 76 to the length of the minor axis of the hemiellipsoidal portion 71 being approximately 1:1.3 in the example illustrated, and the wall thickness of the shell being of the order of 0.10 inch.

The separation of a moulded piece of this configuration from a rigid core upon which it has been moulded is effected by admitting hydraulic fluid under pressure through hose 58 (FIG. 1) into the outer end of the cylinder 50, thus propelling the ejector slide 54 and its head 60 leftward as viewed in FIGS. 2, 4 and 6. During this movement, the angularly disposed lower edge 61 of the ejector head 60 engages the edge 72 of the moulded piece 70 rocking it progressively to the positions in which it is shown in FIGS. 4 and 6; the force exerted against the edge 72 being, by virtue of the location of the pivot 62, substantially parallel to the adjacent surface of the moulded piece.

As this movement takes place, the edge 74 of the moulded piece 70 fulcrums against a shoulder 75 of the core 30, the angularly disposed lower edge 61 of the ejector head 60 engages under the edge 72, and the head 60 rocks counterclockwise around its pivot 62 which, as shown, is disposed above the horizontal center line of the slide 54 to facilitate such rocking.

Thus the moulded piece itself acts as a lever of the second class during its separation from the core, in the course of which the projections 76 are temporarily wedged apart by the camming action of the opposite curved surfaces of the core 30 as shown in FIGS. 5 and 6, and the hemiellipsoidal body portion is temporarily distorted toward a more nearly spherical configuration. But for this temporary flexing and distortion, however, the moulded piece constitutes a substantially rigid lever. The resiliency of the moulded material is such, however, that it resumes the shape in which it was moulded as soon as the projections 76 have passed over the maximum dimensions of the minor axis of the hemiellipsoidal portion of the core 30, i.e., past and point indicated at 80 in FIG. 6.

As the movement of the ejector slide 54 and its head 60 propel the projections 76 past the point 80, a switch actuating lug 85 (FIG. 2) carried on a rod 87 attached to the ejector slide 54 engages a limit switch 89 fixed to the frame of the moulding machine. This switch controls the magnetic valve, previously mentioned, to cause the same to admit hydraulic fluid under pressure to cylinder 50 (FIG. 1) through line 59 and permit discharge of such fluid through line 58, thus effecting retraction of the slide 54 and head 60 to the position shown in FIG. 2.

The helmet shell being thus freed from the core, it may be grasped by the projecting sprue 40 as illustrated in FIG. 7 and finished by clipping off the sprue.

It will be understood that the foregoing description relates only to a preferred embodiment of the invention and that modifications thereof within the spirit and scope of the appended claims are likewise embodiments of the present invention.

What is claimed is:

1. In injection moulding apparatus for moulding a hollow open-sided shell of rounded form; said apparatus comprising a core and separable members defining a mould cavity enclosing said core, the improvement comprising an ejecting mechanism for removing moulded shells from said core following separation of said mould cavity defining members, including an ejector slide mounted for reciprocable movement with respect to said core, an ejector head pivotally mounted on said slide and engageable with an edge of a shell carried on said core, and a shoulder on said core engageable by an opposite edge of a shell carried on said core; whereby, upon reciprocation of said ejector slide, said ejector head will engage a shell carried on said core to fulcrum the same against said shoulder for removal from said core.

* * * * *